United States Patent Office 3,193,581
Patented July 6, 1965

3,193,581
PROCESS OF PREPARING 1-PHENYL-2-
AMINOPROPANE
Kamenosuke Shinohara and Hikaru Tamura, Tokyo, and Tomiko Hosoda, Urawa, Saitama Prefecture, Japan, assignors to Yamanouchi Pharmaceutical Co., Ltd., Tokyo, Japan, a Japanese company
No Drawing. Filed Feb. 26, 1962, Ser. No. 175,837
Claims priority, application Japan, Mar. 1, 1961, 36/6,766; Mar. 10, 1961, 36/8,026
3 Claims. (Cl. 260—570.8)

This invention relates to novel syntheses of pharmacologically important 1-phenyl-2-aminopropane from 1-phenyl-2-aminopropanediol-1,3 (I) through a novel compound 1-phenyl-2-amino-3-iodopropane (II) or 1-phenyl-2-amino-1,3-dibromopropane.

1-phenyl-2-aminopropane which is obtained by the process according to the present invention is represented by the following formula

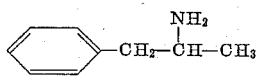

A typical compound of this category is amphetamine which is known as a valuable adrenergic drug. It has so far been prepared from benzylmethylacetamide, from phenyl acetone, or from either corresponding tertiary alcohol or alkene. We have discovered that the above compound can be prepared by novel syntheses from 1-phenyl-2-amino-propanediol through 1-phenyl-2-amino-3-iodo-propane or its derivative or through 1-phenyl-2-amino-1,3-dibromopropane. The novel syntheses of the present invention will be shown, for example, by the following reactions:

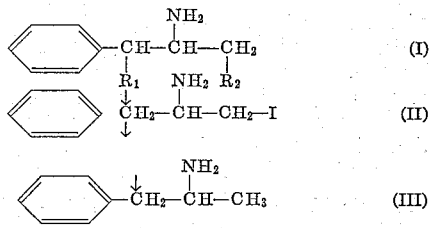

In these chemical formulas, $R_1$ and $R_2$ are each a member selected from the group consisting of hydrogen atom, halogen atom selected from bromine and chlorine, hydroxy and alkoxy groups, and $R_1$ and $R_2$ may be two alkoxy type bondings of a single molecule.

Suitable starting materials used in the processes of the present invention are 1-phenyl-2-aminopropanediol and its derivatives which can be represented by the above-indicated general formula (I). Typical compounds include:

DL-1-phenyl-2-aminopropanediol-1,3 (Dg-threo M.P. 114–5° C., $[\alpha]_D^{24}$ −28.9 (ethanol); Lg-threo M.P. 114–5° C., $[\alpha]_D^{26}$ +29.4 (ethanol)), 1-phenyl-2-amino-1,3-dibromopropane, and their dioxane derivatives.

The process according to the present invention consists of merely two steps in which any form of 1-phenyl-2-aminopropanediol-1,3 or its derivative is subjected to reaction with hydriodic acid, by which the aminopropanediol is partially reduced yielding hydriodic acid salt of 1-phenyl-2-amino-3-iodopropane. The last compound will eventually be reduced to 1-phenyl-2-aminopropane, if the reduction is continued for a longer period of time. The rate of deiodination is, however, very slow and it has been found that the following method of reduction is far more practical for the synthesis of the phenylaminopropane.

As is understood from Formula I, 1-phenyl-2-amino-propanediol-1,3 or its dioxane has two asymmetric carbon atoms, and therefore it may exist in four diastereoisomeric forms, Dg-threo, Lg-threo, Dg-erythro- and Lg-erythro-forms, or otherwise in two racemates of threo- and erythro-series.

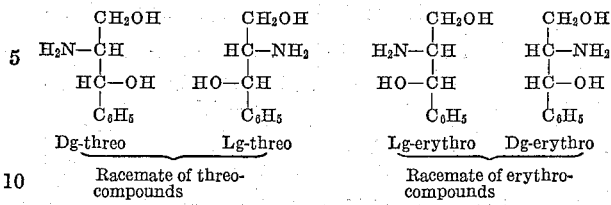

According to the method of the present invention, both Dg-threo- and Lg-erythro-1-phenyl-2-aminopropanediol-1,3 yield Lg (or Ls)-1-phenyl-2-aminopropane while both Lg-threo and Dg-erythro do Dg (or Ds)-1-phenyl-2-aminopropane.

Both racemates of the threo- and erythro-1-phenyl-2-aminopropanediol-1,3 yield DL-1 - phenyl - 2 - aminopropane.

It will be understood that, where no notation appears with a diastereomeric formula or with a chemical name, the formula or name is to be interpreted in its generic sense; that is, a formula or name as representing not only the unresolved mixture of isomers but also the individual stero-isomers and racemates.

Now, detailed explanation will be given hereinunder with reference to individual steps of the process of the present invention.

As to the step for the reaction of the compound (I) with hydriodic acid, the reaction may be carried out in liquid phase. For this purpose, an aqueous solution of 57% hydriodic acid is most suitable, preferably in the presence of a sufficient amount of red phosphorous, because it acts as a reactant and solvent, both at the same time. Other suitable solvents are glacial acetic acid with or without acetic anhydride. The reaction may be carried out at any temperature, but preferably at that of the boiling point of the reaction mixture. Hydriodic acid as reactant should be used in an amount of roughly stoichiometric equivalence or preferably in excessive amount. Suitable reaction period may vary depending on the reaction temperature on the class of solvent employed and on its composition.

As to the step for the reductive deiodination of the compound (II), the reaction is carried out preferably at high temperature to produce the desired compound, 1-phenyl-2-aminopropane. Suitable reductive dehalogenating agents are Raney nickel and lithium aluminum hydride. Although hydriodic acid itself may be effective as the reductive dehalogenating agent, in this case the reaction is too slow to be practical.

Further detailed explanation of the present invention will be given with reference to the following examples, which are informative only and not to be construed as limiting the scope of the present invention.

*Example I.—Preparation of Dg-(−)-1-phenyl-2-amino-3-iodopropane hydriodide*

Lg - threo-(+)-2,2-dimethyl-5-amino-6-phenyl-1,3-dioxane (B.P. $_{20\,mm.}$ 160° C.), $[\alpha_D^{22}$+42.5 (ethanol, 2.0 g./dl.) is used as a starting material in this example. A mixture of 50 g. (0.24 mole) of the dioxane, 500 ml. of about 56 percent solution (about 3.0 mole) of hydriodic acid, 50 g. (1.6 atom weight) of red phosphorus, 250 ml. of glacial acetic acid and 250 ml. of acetic anhydride is refluxed at about 110° C. for 7 hours. The reaction mixture is then filtered while hot to remove the remaining phosphorus and then washed once with about 50 ml. of hot acetic acid. The almost colorless filtrate and washing are united and subjected to distillation under reduced pressure. Large needle crystals, which are stained slightly yellowish with iodine formed by air oxidation of hydriodic acid during distillation, gradually come out as the volume of the reaction mixture decreases. When about 90 volume percent of the solution has been distilled off, the distillation is stopped, and the slightly yellow needle crystals, the desired intermediate, are collected by filtration and then dried, yield 63 g. (67%), M.P. 185–190° C. (decomposition). In the distillate, a large amount of acetone is detected.

The product is recrystallized from ethanol to obtain colorless needles having M.P. 193–196° C. (decomposition), $[\alpha]_D^{25} -37.9 \pm 0.6$ (ethanol, c.=1.0 g./dl.).

The mother liquor from which the yellow needles have been separated is subjected to refluxing for 8 hours, using 250 ml. of the hydriodic acid, 80 ml. of glacial acetic acid, 170 ml. of acetic anhydride and 25 g. of red phosphorus. The reaction mixture is then treated as before, thus obtaining slightly yellow needles, yield 10 g. (11%), M.P. 185–188° C. (decomposition). On recrystallization, the crude product yields colorless needles, M.P. 190–195° C. The mixture of the former crop and the latter shows no depression in melting point (193–196° C.). Total yield in 74 g. (78%).

*Analysis.*—Calcd. for $C_6H_5CH_2CH(NH_3I)$—$CH_2I$: C, 27.79%; H, 3.37%; N, 3.60%; I, 65.62%. Found: C, 27.86%; H, 3.51%; N, 3.60%; I, 65.62%.

In paper chromatography at 25° C. for 17 hours using as solvent a mixture of 4 volumes of butanol and 1 volume of glacial acetic acid, saturated with water, and Toyo No. 50 filter paper, the product gives on development with nynhydrin a spot at R$f$ 0.75.

The infra-red spectrum of this product also supports the structure of 1-phenyl-2-amino-3-iodopropane hydriodide, having absorption bands expressed in $\mu$, at 3.1–3.3 and 3.65–4.15 (—$NH_3^+$); 6.30 (phenyl); 6.45 (—$NH_3^+$); 6.70 (phenyl and —$NH_3^+$); 7.05 and 7.38 (propyl); 8.1 and 8.3 (—C—N and $CH_2$—X); 9.30–9.75 (monosubstituted benzene); 9.95 (benzene); 13.6 and 14.3 (monosubstituted benzene); and 1.38–1.41 (—$NH_2$).

*Example II.—Preparation of Dg-(−)-1-phenyl-2-amino-3-iodopropane hydriodide*

To 16.7 g. (0.1 mole) of Lg-threo-(+)-1-phenyl-2-aminopropanediol-1,3 are added 140 ml. (1.1 mole) of 58.4 percent hydriodic acid and 6.2 g. (0.2 atomic weight) of red phosphorus, the resulting mixture being refluxed at 123–124° C. The liquid part of the reaction mixture is colored yellowish brown at first due to the oxidation of hydriodic acid, but it becomes colorless in about 3 hours after refluxing has started. The rough determination of reaction rate is carried out by pipetting out 1 ml. of reaction mixture at various intervals of time and determining the weight of crystals separated out on cooling at −4° C. The result has indicated the reduction proceeds exponentially with time, reaching about 83 percent yield in about 15 hours, thereafter accurate determination becomes hardly possible by this method due to solidification on cooling of the reaction mixture.

After 24 hours' refluxing, the reaction mixture is cooled in ice water and filtered by suction. The solid portion remaining in the filtrate consists of the product and red phosphorus remaining unreacted. The product is extracted three times using 30 ml. of hot water each time to remove the phosphorus.

The washings are united and cooled to about 5° C. Large colorless needles crystal are collected by filtration and finally dried in a desiccator; yield 28 g., M.P. 193–195° C. (decomposition). The mother liquor is evaporated under reduced pressure, and slightly yellow needles are obtained, yield 1.7 g., M.P. 192–195° C. (decomposition).

When the mother liquor from which the mixture of the product and red phosphorus have been separated is evaporated under reduced pressure, roughly one gram of viscous oily matter is obtained, which has been shown to consist mainly of the iodo-compound contaminated with a small amount of 1-phenyl-2-aminopropane, R$f$ 0.70, and a still smaller amount of 1-phenyl-2-aminopropanol-3, R$f$ 0.60, according to the paper chromatographic analysis. The separation of the 3-iodo-compound from the mixture has not been undertaken.

In consideration of the amount taken for the rate determination experiments, the total yield of this experiment is 85.4 percent of theory.

The mixtures of either one of the crops yielded above and that of Example I has shown no depression in melting point, M.P. 193–195° C. (decomposition). Paper chromatography also as shown identity (R$f$ 0.75) of the two crops with that yielded in Example I.

*Example III.—Variation of the method of Example II*

A mixture is used, of which the composition is exactly the same as that of Example II except that the amount of red phosphorus added is one half. In this case the reaction rate is decreased to one third of that of Example II. After 35 hours of refluxing (124° C.), the reaction mixture which is still yellow colored is treated as in Example II, thus yielding 25.6 g. (85.2% of theory) of the same product, M.P. 190–195° C. (decomposition), no depression in melting point when mixed with the sample obtained in Example I, R$f$ 0.75. The viscous oily mass remained after the evaporation of the mother liquor, from which the first crop has been separated, contains mainly the 3-iodo-compound, a small amount of 1-phenyl-2-aminopropanol-3 and a minute amount of 1-phenyl-2-aminopropane according to paper chromatography.

*Example IV.—Variation of the method of Example II*

A reaction mixture, of which the composition is the same as that of Example II except that both the amounts of hydriodic acid and red phosphorus added are just one half of those used in Example II, is used. The rate of the reaction is about one fourth of that of Example II.

By the same treatment as in Example II, 10.6 g. (43.8% of theory) of the (−)-1-phenyl-2-amino-3-iodopropane hydriodide is yielded, M.P. 190–195° C. (decomposition), R$f$ 0.75. According to the chromatography, the viscous oily matter obtained as in cases of Examples II and III consists mainly of the iodo-compound and a small fraction of 1-phenyl-2-aminopropanol-1. 1-phenyl-2-aminopropane has not been detected in this case.

*Example V.—Preparation of Lg-(+)-1-phenyl-2-amino-3-iodopropane hydriodide from Dg-threo-(−)-2,2-dimethyl-5-amino-6-phenyl-1,3-dioxane*

A mixture of 31.0 g. (0.15 mole) of Dg-(−)-threo-2,2-dimethyl-5-amino-6-phenyl-1,3-dioxane (B.P.$_{19\ mm.}$ 157° C.) $[\alpha]_D^{22} -45.2 \pm 0.5$ (ethanol, c.=2.0 g./dl.), 216 ml. (1.6 mole) of 56 percent hydriodic acid and 9.3 g. (0.3 atomic weight) of red phosphorus is refluxed at 106° C. for 10 hours. The reaction mixture is rapidly filtered by suction to remove unreacted phosphorus, thus obtaining yellowish filtrate. The phosphorus remaining on the filter is washed twice using 25 ml. of ethanol each time. On cooling the filtrate, large needles stained yellow by iodine separate out, which are then collected by filtration and washed with ether, thus obtaining almost colorless crystals, yield 21 g. (36%), M.P. 180–192° C. (decomposition).

By recrystallization from ethanol, colorless needles, M.P. 190–195° C. (decomposition), $[\alpha]_D^{22} +39.3 \pm 1.0$ (ethanol, c.=2.0 g./dl.). R$f$ 0.75, is obtained, yield 14 g. (24% of theory).

*Analysis.*—Calcd. for $$C_6H_5-CH_2-CH(NH_3+)-CH_2I \cdot HI$$

Total I (m. atom), 0.338; I⁻ (m. mole), 0.169. Found: Total I (m. atom), 0.339; I⁻ (m. mole), 0.178.*

---

* About 5 percent excess is due to the hydrolysis during silver nitrate titration of iodine combined by covalence with carbon atom.

From the mother liquor are obtained 17.2 g. (30%) of yellowish brown crude crystals, M.P. 100–115° C. (decomposition). Total yield of the crude product is thus 38.2 g. (66% of theory), which will, no doubt, be increased by prolonging the heating period of time in view of the result of the preceding examples.

*Example VI.—Preparation of Dg-(+)-1-phenyl-2-aminopropanol-3 from Lg-threo-(+)-phenyl-1-aminopropanediol-1,3*

A mixture of 8.4 g. (0.05 mole) of Lg-threo-(+)-phenyl-2-aminopropanediol-1,3, 75 ml. (0.57 mole) of about 57% hydriodic acid, and 1.6 g. (0.1 atomic weight) of red phosphorus is refluxed at 124° C. After exactly 2 hours, the mixture still having slightly yellow color is filtered while hot to remove the remaining phosphorus, and the filtrate is allowed to stand overnight in ice-box, whereby 1 - phenyl - 2 - amino-3-iodopropane hydriodide crystallizes out in yellowish needles. The crystals are collected by filtration and washed twice with ether to obtain colorless needles, yield 3.5 g. (0.01 mole), M.P. 192–195° C. (decomposition). Mixed with an authentic sample of the Dg-(−)-1-phenyl-2-amino-3-iodopropane hydriodide, it shows no depression of melting point. On condensation in vacuum of the mother liquor, still 0.8 g. of the same crystals, M.P. 188–193° C., are obtained. Thus, the total yield of the somewhat crude iodopropane hydriodide is 4.3 g. (22%).

The mother liquor, from which the second crop has been separated, is made strongly alkaline by the dropwise addition of 10% sodium hydroxide solution, and the alkaline mixture is evaporated in vacuum to dryness. The dried white mass is powdered and extracted with ether in a soxleht apparatus. From this ether extract slightly yellowish needles are obtained, yield 2.0 g. (26.4%), M.P. 92–93° C. Colorless needles (1.0 g.) obtained by recrystallization from a mixture of ethanol and ether by the addition of petroleum ether, have shown M.P. 92–93° C. $[\alpha]_D^{24}$+23.0±0.10 (ethanol 0.5 g./dl.). The product shows no depression of M.P. (92° C.) in admixture with an authentic sample of Dg-(+)-1-phenyl-2-aminopropanol-3, which has been prepared in good yield from 1-phenyl-2-amino-3-iodopropane hydriodide by treating it with alkali solution. The residue (6.9 g.) of the ether extraction is white powder which consists mainly of sodium iodide, some inorganic carbonate and small amount of an unidentified organic amine.

*Example VII.—Preparation of Lg-(−)-1-phenyl-2-amino-3-iodopropane hydriodide from Lg-(+)-1-phenyl-2-aminopropanol-3*

A mixture consisting of 15.1 g. (0.1 mole) of Lg-(+)-1-phenyl-2-aminopropanol-3, M.P. 92–93° C., $[\alpha]_D^{30}$+18.2±1.0 (ethanol, c.=1.0 g./dl.), 140 ml. (1.06 mole) of 57% hydriodic acid and 6.2 g. (0.2 atomic weight) of red phosphorus is refluxed at 123–4° C. The halogenation proceeds at about the same rate as in case of Example II. After 24 hours refluxing, the reaction flask is cooled to 0° C., when abundant needles crystallize out which are then filtered off together with the remaining red phosphorus. The crystals on the filter are dissolved in 60 ml. of boiling water to separate the phosphorus. When the hot filtrate is cooled to 0° C., colorless needles come out, which are filtered and dried, yield 33 g., M.P. 190–195° C. (decomposition). From the mother liquor, there is obtained, on vacuum evaporation, 1.2 g. of colorless needles, M.P. 190–195° C. (decomposition), which has shown no depression of melting point when mixed with the first crop or with the sample obtained in Example I. The total yield is 97.9% introducing into calculation the amount of the reaction mixture used for the rate determination.

The second mother liquor from which the second crop has been separated is evaporated in vacuo, thus obtaining 5.6 g. of a syrupy matter mixed with needles. The syrup consists mainly of phosphoric acid (1.6 g. as phosphorus), and a minute amount of needles which has been identified as the desired product.

*Example VIII.—Preparation of Dg-(+)-1-phenyl-2-aminopropane and its hydrochloride*

To 150 ml. of tetrahydrofuran is added 0.5 g. (about 0.01 mole) of lithium aluminum hydride of 75% purity and refluxed (66° C.) for an hour to remove water possibly present in it, thereafter another portion of 3.0 g. (0.06 mole) of the hydride being added. To this mixture 10 g. (0.026 mole) of Dg-(−)-1-phenyl-2-amino-3-iodopropane hydriodide is added little by little and the resulting mixture is refluxed for about 5 hours. After cooling, a mixture of tetrahydrofuran and water is added to the reaction mixture and boiled for about 15 minutes to decompose the hydride remaining unreacted. After having been cooled, the mixture is filtered by suction and the filtrate is collected. The precipitate on the filter is washed thrice using each time 25 ml. of the solvent. The filtrate and washings are combined and condensed to syrupy consistency by evaporation under reduced pressure. The viscous residue is then dissolved in 5 ml. of water, to which 5 ml. of 25 percent sodium hydroxide solution is added to make the solution strongly alkaline, when amine-like odor evolves.

An oily layer, which is separated out on the aqueous layer, is then extracted thrice with ether. The combined ether extracts is dried with anhydrous sodium sulfate and then evaporated, thus obtaining slightly yellowish oily substance with distinct amine-like odor. It is distilled under reduced pressure to obtain colorless oily product, B.P.$_{19\ mm.}$ 85–90° C., yield 3.0 g. (86.5%), $[\alpha]_D^{25}$ +35.6±0.5 (ethanol, c.=2.03 g./dl.), mol. wt. determined by neutralization 139.6 (135.2 theory). This somewhat higher value is mainly due to the absorption of atmospheric moisture as well as evaporation while weighing and titration. Its IR absorption bands wholly coincide with those of dl-1-phenyl-2-aminopropane (Sadtler's Standard Spectra, No. 134). This product is Dg-(+)-1-phenyl-2-aminopropane.

From dried ether solution of this purified product, colorless needles of its hydrochloride precipitate out on passing hydrogen chloride gas through it. The needles are collected and dried over sodium hydroxide, M.P. 154–155° C., $[\alpha]_D^{25}$ +26.0±1.5 (water, c=2.3 g./dl.).

*Analysis.*—Calcd. for $C_9H_{14}NCl$: N, 8.15; Cl, 20.66. Found: N, 8.14; Cl, 20.74.

Its IR absorption bands coincide essentially with those of dl-1-phenyl-2-aminopropane sulfate (Sadtler's Standard Spectra, No. 14721).

*Example IX.—Preparation of Lg-(−)-1-phenyl-2-aminopropane and its hydrochloride*

15 g. (0.0385 mole) of Lg-(+)-1-phenyl-2-amino-3-iodopropane hydriodide is subjected to reduction using 5.43 g. (0.008 mole) of 56% lithium aluminum hydride for a period of 5 hours at 68.5° C. in 150 ml. of dried tetrahydrofuran. The reaction mixture is cooled in ice water, to which a mixture of 7.2 ml. of water and 42.8 ml. of tetrahydrofuran is slowly added and the resulting mixture is stirred for one hour to insure the decomposition of the remaining hydride. It is then filtered and the precipitate on a filter is washed thrice using each time 20 ml. of tetrahydrofuran. The filtrate and washings are combined and then evaporated under reduced pressure, thus obtaining 5.0 g. of slightly yellowish syrup with amine-like odor.

The oily matter is suspended in a mixture of 20 ml. of water and 8 ml. of 25% sodium hydroxide solution and is extracted thrice with ether using each time 20 ml. of ether. After having been dried with anhydrous sodium sulfate, the combined ether extracts are evaporated and the residue is subjected to vacuum distillation in atmosphere of nitrogen, thus obtaining 1.6 g. (80% of theory of colorless oily product, B.P.$_{4-5\ mm.}$ 47–53° C., $[\alpha]_D^{21}$ −36.6±0.5° C. (ethanol, c.=2.34 g./dl.), Rf 0.70. Acid equivalence: material used, 0.5765 m. mole; HCl used for neutralization, 0.5575 m. mole. This is Lg-(−)-1-phenyl-2-aminopropane which is the antipode of the product obtained in Example VIII. The free 1-phenyl-2-aminopropane (0.5 g.) is dissolved in dry ether. Fine needles precipitated out on passing hydrogen chloride gas through the resulting solution is collected and dried, yield 0.7 g. (M.P. 153–154° C.) $[\alpha]_D^{23}$ −26.7±0.1 (water, c.=2.2 g./dl.).

The mixture of this product and the hydrochloride obtained in Example VI shows depression of M.P. (145–147° C.).

*Analysis.*—Sample used 0.04422 g. (0.2576 m. mole). Calcd. for $C_9H_{14}NCl$: Cl, 0.2576 m. mole. Found: Cl, 0.2575 m. mole.

*Example X.—Preparation of Lg-(+)-1-phenyl-2-aminopropane*

In a mixture of 50 ml. of ethanol and 50 ml. of water, 11.7 g. (0.03 mole) of Lg-(−)-1-phenyl-2-amino-3-iodopropane hydriodide is dissolved and the resulting solution is subjected to reductive deiodination in atmosphere of hydrogen using Raney nickel (2.5 g. in wet state) as catalyst. The initial pressure of hydrogen in the reduction vessel at 22° C., is 70 kg./cm.$^2$ which gradually rises to 80 kg./cm.$^2$ in 2 hours as the vessel is heated to 100–110° C. The reaction mixture is then cooled to room temperature, and is filtered, thus obtaining a green colored filtrate. It is condensed by evaporation under reduced pressure and sufficient amount of sodium hydroxide solution (ca. 50%) is added to make the mixture strongly alkaline. Precipitate thus formed is filtered off and washed thrice with ether using 10 ml. each time. The filtrate, on which oily matter is floating, is shaken thrice with the ether used for washing. The ether extracts are combined and dried with anhydrous sodium sulfate.

The oily matter remaining after evaporation of ether is distilled under reduced pressure, thus obtaining colorless oily substance with distinct amine odor, yield 3.2 g. (79.1%), B.P. $_{6\text{ mm.}}$62–63° C., $[\alpha]_D^{23.3}$ +39.6±1.4, Rf 0.70. The N-benzoyl derivative of this amine, prepared by the Schotten Baumann reaction, melts at 1535° C. No melting point depression in admixture with an authentic sample, M.P. 154.0° C. The free amine has been found to be identical with that obtained in Example VIII.

*Example XI.—Preparation of 1-phenyl-2-aminopropane from 1-phenyl-2-aminopropanediol-1,3 through 1-phenphenyl-2-amino-1,3-dibrompropane hydrobromide*

(a) A mixture of 24.8 g. (0.1 mole) of Lg-(+)-1-phenyl-2-aminopropanediol-1,3 hydrobromide, M.P. 145–146° C., $[\alpha]_D^{23}$ +31.85±0.16 (ethanol, c.=1.222 g./dl.) and 10 g. (0.4 mole) of phosphorus tribromide is heated for one hour on a water bath, when vigorous reaction takes place with formation of reddish orange mass. After one hour the excess phosphorus tribromide is distilled off in vacuum and the residue is washed rapidly with a little water and dissolved in 200 ml. of ethanol. The ethanol solution is treated once with active charcoal obtaining colorless solution, from which 7.8 g. of parallelogrammic platelets, M.P. 204–205° C. (decomposition), is obtained on cooling. From the mother liquor total amount of 28.6 g. of the same product, M.P. 193–205° C. (decomposition) is obtained on repeated evaporation. Total yield of the desired dibromide is thus 36.4 g. (94.9%). A portion of the crude product combined is recrystallized from ethanol yielding the pure product, M.P. 204–205° C. (decomposition), $[\alpha]_D^{23}$ +68.13±1.23 (ethanol, c.=1.136 g./dl.).

The optical rotation of the same solution changes to $[\alpha]_D^{23}$ +56.95±0.97 on standing at 15–18° C. overnight.

*Analysis.*—Theor.: (as $C_9H_{12}N \cdot Br_3$): Br, 64.1; N, 3.75. Found: Br, 63.0; N, 3.79.

(b) To a mixture of 1.9 g. (0.045 mole) of lithium aluminium hydride of 92.4 percent purity and 100 ml. of dried tetrahydrofuran is added little by little 7.5 g. (0.02 mole) of (+)-1-phenyl-2-amino-1,3-dibromopropane hydrobromide. The resulting mixture is refluxed at about 65° C. for one hour. After cooling the mixture to room temperature 10 ml. of tetrahydrofuran containing 10 percent of water is added dropwise to decompose the hydride remaining in excess. The hydroxide of the metals thus formed is removed by filtration and washed twice with tetrahydrofuran using 10 ml. each time.

The filtrate and washings combined are evaporated in vacuum to about 10 ml. and then extracted twice with ether after the addition of a sufficient amount of aqueous alkali. The ether extract is evaporated after it has been dried over anhydrous sodium sulfate. The residue is distilled under reduced pressure thus obtaining colorless oily substance of amine-like odor, yield 0.9 g. (67%), B.P. $_{5\text{ mm.}}$65–77° C., Rf 0.70.

This product is subjected to the Schotten-Baumann reaction yielding N-benzoyl-(+)-amphetamine, M.P. 155° C. A mixture of this product and an authentic sample, M.P. 156° C., shows no melting point depression (M.P. 154.5° C.) The free amine obtained here is Dg-(+)-1-phenyl-2-aminopropane.

What we claim is:

1. A process for preparing d-amphetamine which comprises halogenating with at least a stoichiometric amount of hydroiodic acid, at the boiling point of the reaction mixture, a starting compound selected from the group consisting of L-threo- and D-erythro-1-phenyl-2-aminopropanediol-1,3 and their dioxanes, to produce, as an optically active intermediate product, d-1-phenyl-2-amino-3-iodopropane, and then treating said intermediate product with a reductive dehalogenating agent selected from the group consisting of lithium aluminum hydride and Raney nickel with hydrogen.

2. The process as in claim 1, wherein said hydroiodic acid is in the form of a 57% aqueous solution thereof.

3. The process as in claim 1, wherein the halogenating of said starting compound is carried out in the presence of red phosphorus.

References Cited by the Examiner

UNITED STATES PATENTS 2,597,445   5/52   Bruce et al. _____ 260—570

FOREIGN PATENTS 767,186   1/52   Germany.

OTHER REFERENCES

Gensler et al.: "Jour. Amer. Chem. Soc.," volume 74, pages 4451–2 (1952).

Ose et al.: "Chemical Abstracts," vol. 52, page 18289 (1958).

Wagner et al.: "Synthetic Organic Chemistry," page 8 (1953).

CHARLES B. PARKER, *Primary Examiner.*

LEON ZITVER, *Examiner.*